(12) United States Patent
Swart et al.

(10) Patent No.: US 6,459,249 B2
(45) Date of Patent: Oct. 1, 2002

(54) RESET CIRCUIT

(75) Inventors: Marten Swart, Obertraubling (DE); Ekkehart-Peter Wagner, Bad Abbach (DE); Christian Zelger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 38 days.

(21) Appl. No.: 09/738,641

(22) Filed: Dec. 22, 2000

Related U.S. Application Data

(63) Continuation of application No. PCT/DE99/01720, filed on Jun. 11, 1999.

(30) Foreign Application Priority Data

Jun. 22, 1998 (DE) .......................... 198 27 705

(51) Int. Cl.[7] ................................ G05F 3/26
(52) U.S. Cl. ..................... 323/315; 323/901
(58) Field of Search ................ 323/312, 313, 323/314, 315, 901; 361/92; 327/142

(56) References Cited

U.S. PATENT DOCUMENTS

| 4,011,484 A | * | 3/1977 | Paice et al. ............... 361/92 |
| 5,070,295 A | | 12/1991 | Morigami |
| 5,359,233 A | * | 10/1994 | Mumper et al. |
| 5,552,725 A | * | 9/1996 | Ray et al. ............... 327/142 |
| 6,163,183 A | * | 12/2000 | Azimi et al. ............. 327/142 |

FOREIGN PATENT DOCUMENTS

| DE | 195 27 603 A1 | 2/1996 |
| EP | 0 374 968 A2 | 6/1990 |
| EP | 0 562 397 A2 | 9/1993 |
| EP | 0 595 748 A1 | 5/1994 |
| EP | 0 767 416 A1 | 4/1997 |

OTHER PUBLICATIONS

Published International Application No. WO 98/05126 (Sandhu), dated Feb. 5, 1998.

* cited by examiner

*Primary Examiner*—Adolf Deneke Berhane
(74) *Attorney, Agent, or Firm*—Laurence A. Greenberg; Werner H. Stemer; Ralph E. Locher

(57) ABSTRACT

A reset circuit for deactivating a circuit configuration, which is fed by a supply voltage, in the case of an undervoltage supply. In this case, active components 1,2 (FIG. 1); or 3,2 (FIG. 3) are provided and their forward paths are connected in series between the supply voltage Uv and ground reference potential. The active components are fed directly or indirectly by a current mirror circuit 9 from a respective current source 10, 11. A reset signal Ureset (active=low signal) being present at the junction point 5 of the active components, where the junction point 5 is connected to ground reference potential via a resistor Rdown.

6 Claims, 2 Drawing Sheets

RESET CIRCUIT

CROSS-REFERENCE TO RELATED APPLICATION

This is a continuation of copending international application PCT/DE99/01720, filed Jun. 11, 1999, which designated the United States.

BACKGROUND OF THE INVENTION

Field of the Invention

The invention relates to a reset circuit for deactivating a circuit configuration in the event that the supply voltage drops below a specific level to an undervoltage.

A reset circuit of the generic type serves for deactivating an external circuit configuration, e.g. in the form of a microcontroller circuit which is operated by a supply voltage and is intended to be brought to a stable, deactivated state if the supply voltage falls below a specific level, so that logic circuits operated in connection with the microcontroller circuit cannot assume undefined states. In other words, the external circuit configuration is deactivated.

Reset circuits according to the prior art operate, e.g. with a charge pump, which is fed by the supply voltage of the microcontroller, and with a transistor operating as an actuator, across which a bias voltage is dropped. The bias voltage can be kept very small by means of the charge pump during normal operation. In the case of undervoltage supply, the bias voltage assumes a relatively large value and thus reliably deactivates the microcontroller circuit if the supply voltage drops below a specific value. A hysteresis effect is produced in this case, so that the microcontroller circuit "starts up" again only if the supply voltage rises above a specific threshold value.

Circuits of the aforementioned type are relatively complex and expensive.

DE 195 27 603 A1 discloses an electrical circuit configuration for generating a reset signal in the case of undervoltage supply of a microcomputer, which circuit configuration has a series circuit—connected to a voltage to be monitored formed by an npn transistor and a resistor, at the junction point of which the reset signal can be tapped off. The resistor must have a relatively high resistance in order to keep the thermal loading on the transistor within limits. This resistor together with resistors which are located in the microcomputer and are connected to the positive pole of the voltage to be monitored forms a voltage divider, whereby an unambiguous reset signal (low signal) is not ensured.

EP 0 767 416 A1 discloses a circuit for supplying voltage to a microcomputer with generation of a reset signal in the case of undervoltage supply, which circuit has a plurality of capacitors. Undefined states, which should be avoided under all circumstances, can arise in the time between the undershooting of the minimum supply voltage and the appearance of a reset signal.

SUMMARY OF THE INVENTION

It is accordingly an object of the invention to provide a reset circuit which overcomes the above-mentioned disadvantageous of the prior art circuits of this general type, and which operates reliably over a wide supply voltage range, requires few components and is thus cost-effective and simple to integrate.

With the foregoing and other objects in view there is provided, in accordance with the invention a reset circuit for, in an event of an undervoltage supply, deactivating a circuit configuration that is fed by a supply voltage. The reset circuit includes two active switching elements having forward paths connected together at a junction point and connected in series between a supply voltage and a ground reference potential. Each one of the two active switching elements has a control terminal. The reset circuit also includes a resistor having one terminal connected to the ground reference potential and another terminal connected to the junction point, at least one forward-biased diode; a first current source connected to the supply voltage via the at least one diode; and a second current source connected to the supply voltage. The control terminal of each one of the two active switching elements is driven by a respective one of the first current source and the second current source. The junction point provides a reset signal.

In accordance with an added feature of the invention, the active switching elements are transistors selected from the group consisting of bipolar transistors and field-effect transistors.

In accordance with an additional feature of the invention, the reset circuit includes a current mirror circuit which includes one of the two active switching elements. The one of the two active switching elements has a drain-source path connected between the supply voltage and the junction point. The one of the two active switching elements is driven by the first current source. The current mirror circuit also includes another active switching element having a drain-source path connected between the first current source and the ground reference potential, the other active switching element being driven by the first current source.

In accordance with another feature of the invention, the reset signal is active low.

In accordance with a further feature of the invention, the reset circuit is used with a motor vehicle electronic circuit.

In accordance with a concomitant feature of the invention, the second current source is directly connected to the supply voltage.

The reset circuit according to the invention has the advantage that a minimum number of components are required and deactivation of the external circuit configuration is performed reliably.

Other features which are considered as characteristic for the invention are set forth in the appended claims.

Although the invention is illustrated and described herein as embodied in a reset circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
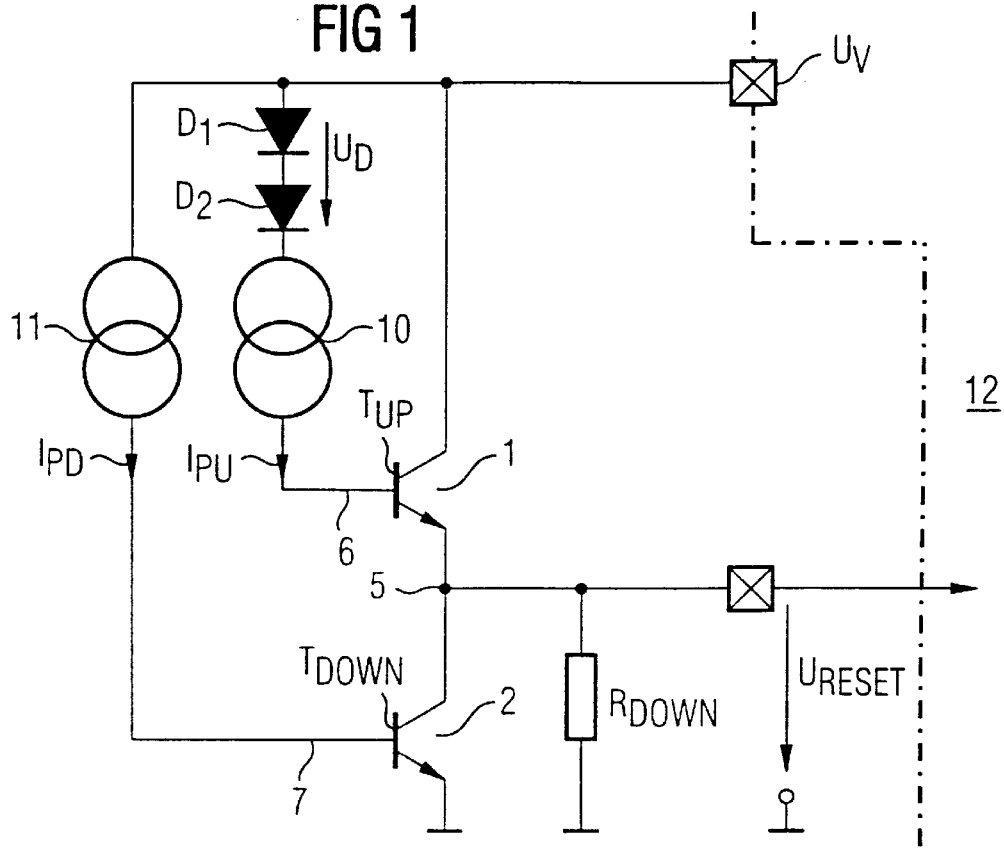
FIG. 1: shows a first circuit diagram of a reset circuit.

Referring now to the figures of the drawing in detail and first, particularly, to FIG. 1 thereof, there is shown a first exemplary embodiment of an inventive reset circuit. Two active switching elements 1 and 2 are shown with their forward paths connected in series between supply voltage $U_V$ and ground reference potential. At the junction point 5 of the switching elements, the reset signal $U_{RESET}$ is present as an active low signal for deactivating e.g. an external microcontroller circuit 12. The junction point 5 is connected to ground reference potential via the resistor $R_{DOWN}$. The resistor $R_{DOWN}$ can also be omitted. In the exemplary embodiment, the active switching elements 1 and 2 are bipolar npn transistors $T_{UP}$ and $T_{DOWN}$. The control terminals 6 and 7 of the active switching elements 1 and 2, which are embodied as bases of the bipolar transistors $T_{UP}$ and $T_{DOWN}$, are directly driven with respective currents $I_{PU}$ and $I_{PD}$ of respective current sources 10 and 11. The current sources 10 and 11 are fed by the supply voltage $U_V$. The first current source 10 is connected to the supply voltage $U_V$ via at least one forward-biased diode $D_1$. In the preferred embodiment shown in FIG. 1, two or more forward-biased diodes $D_1$, $D_2$ can be provided between current source 10 and supply voltage $U_V$.

The method of operation of the first exemplary embodiment shown in FIG. 1 shall be explained with reference to the diagrams of FIGS. 2a and 2b.

If the supply voltage $U_V$ has a sufficiently high level of e.g. 5 V for operating the external circuit configuration 12 e.g. in the form of a microcontroller, the currents $I_{PU}$ and $I_{PD}$ flow for the purpose of driving the respective active switching element 1 and 2 in the form of a bipolar npn transistor $T_{UP}$ or $T_{DOWN}$. A high level is established at the junction point 5 on account of the currents IPU and IPD chosen and on account of the characteristics of the two bipolar transistors $T_{UP}$ and $T_{DOWN}$, respectively. As a result, the external circuit configuration 12 is not deactivated, but rather remains in its operating state. If the level of the supply voltage $U_V$ then falls to an extent such that, on account of the threshold voltage of the two diodes $D_1$ and $D_2$, the current source 10 cannot supply a sufficient drive current for the base of the transistor $T_{UP}$, the potential at the junction point 5 then goes to a low level. The microcontroller circuit 12 is thereby deactivated.

Each current source requires a certain drop voltage for operation. By inserting the two diodes $D_1$ and $D_2$, the available voltage for the current source $I_{PU}$ driving the transistor TUP is reduced. In this way, it can be ensured that when the supply voltage $U_V$ drops, the current $I_{PU}$ falls first and only subsequently does the current $I_{PD}$, which drives the transistor $T_{DOWN}$, drop. Thus, even at a relatively low supply voltage $U_V$, the forward path of the transistor $T_{DOWN}$ is kept at a lower resistance than the forward path of the transistor $T_{UP}$. Therefore, the reset signal $U_{RESET}$ is always pulled to a low level when the supply voltage $U_V$ drops. If the supply voltage $U_V$ is then so low that the current IPD of the current source 11 also fails, the resistor $R_{DOWN}$ performs the task of keeping the reset signal $U_{RESET}$ at a low level in a defined manner.

Figure 3:
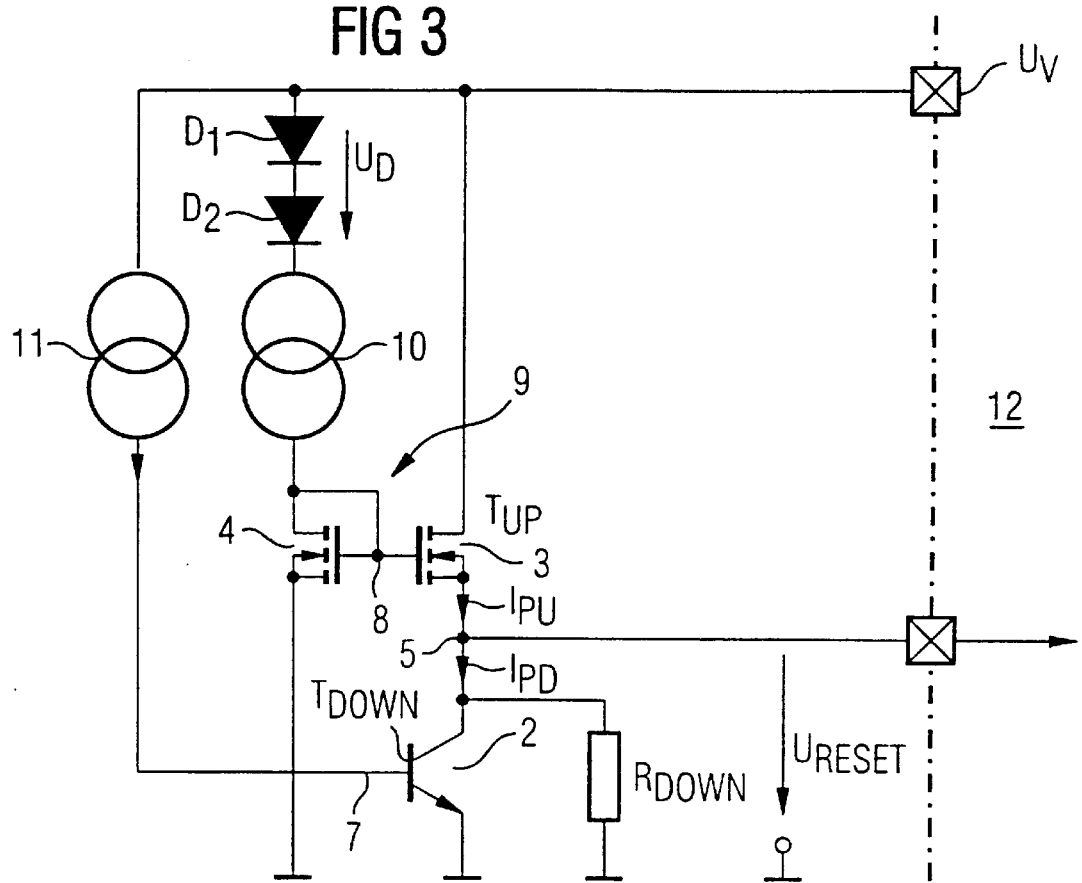
FIG. 3: shows a second exemplary embodiment of a reset circuit.

The second exemplary embodiment—illustrated in FIG. 3—of the reset circuit according to the invention operates, in principle, similarly to that shown in FIG. 1.

A current mirror circuit 9 formed from field-effect transistors 3,4 and a bipolar transistor 2 are provided as active switching elements. The current mirrored by the field-effect transistor 4 to the field-effect transistor 3 is designated by $I_{PU}$ and the current flowing through the collector-emitter path of the bipolar transistor 2 is designated by $I_{PD}$. The currents $I_{PU}$ and $I_{PD}$ are the respective current of the current sources 10 and 11 magnified by the current gain factor of the transistors. The gate electrodes 8 of both field-effect transistors 3 and 4 are connected to the current source 10 and to the drain electrode of the field-effect transistor 4.

Figure 2A:
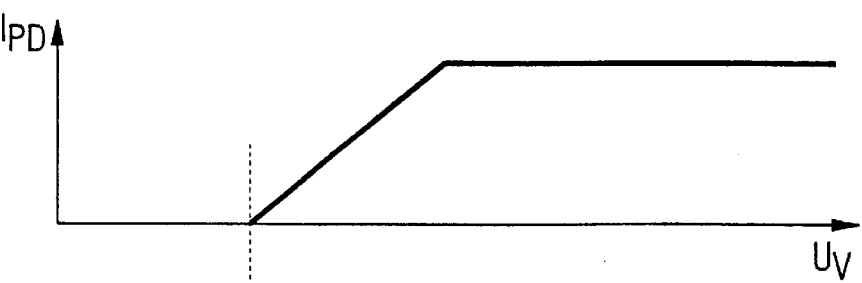
FIG. 2a: shows the profile of the current of the current source 11 plotted against the supply voltage.
Figure 2B:
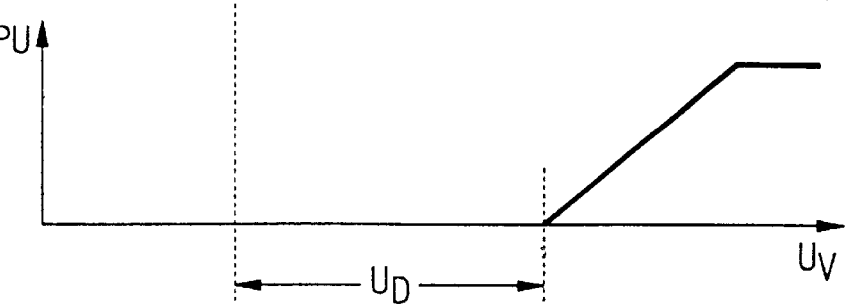
FIG. 2b: shows the profile of the current of the current source 10 plotted against the supply voltage.
Figure 4A:
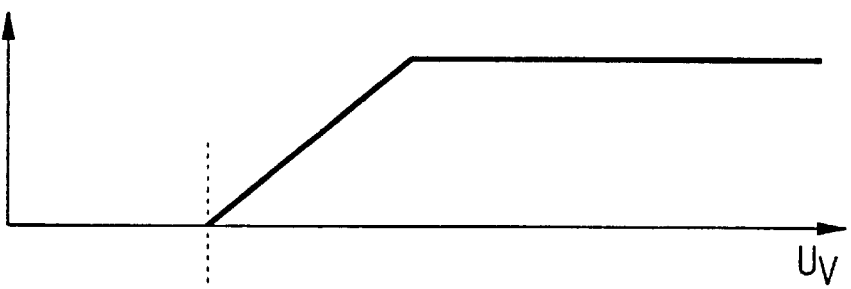
FIG. 4a: shows the profile of the current $I_{PD}$ through the transistor 2.
Figure 4B:
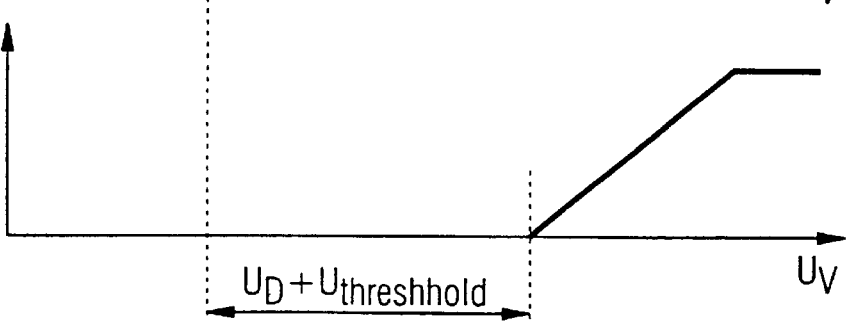
FIG. 4b: shows the profile of the current $I_{PU}$ through the transistor 3.

The method of operation is apparent from the diagrams of FIGS. 4a and 4b, which are in principle identical to FIGS. 2a,b.

The only difference to be found in FIGS. 4a,b is that the threshold voltage of the field-effect transistors as gate-source voltage, which is approximately 2 V in addition, is superposed on the diode forward voltages $U_D$ of the two diodes $D_1$ and $D_2$. Therefore, the diodes $D_1$ and $D_2$ can also be obviated when using the current mirror circuit with the field-effect transistors.

The current mirror circuit 9 is characterized in that the first field-effect transistor 3 is connected with its drain-source path between the supply voltage $U_V$ and the junction point 5, and the second field-effect transistor 4 is connected with its drain-source path between the first current source 10 and ground reference potential. The gate electrodes 8 of both field-effect transistors 3,4 are connected together and connected to the first current source 10.

The reset signal $U_{RESET}$ is an active low signal.

The above-described circuits of FIGS. 1 and 3 can also be used as supplementation to a comparator circuit (not illustrated). The accuracy of the reset threshold is distinctly increased by such a comparator circuit.

The circuits described guarantee a reliable reset signal URESET even when the minimum operating voltage of the comparator is undershot.

The reset circuit according to the invention is characterized by the use in motor vehicle electronics.

We claim:

1. A reset circuit for, in an event of an undervoltage supply, deactivating a circuit configuration that is fed by a supply voltage, the reset circuit comprising:
   two active switching elements having forward paths connected together at a junction point and connected in series between a supply voltage and a ground reference potential, each one of said two active switching elements having a control terminal;
   a resistor having one terminal connected to the ground reference potential and another terminal connected to said junction point, said junction point providing a reset signal;
   at least one forward-biased diode;
   a first current source connected to the supply voltage via said at least one diode; and
   a second current source connected to the supply voltage;
   said control terminal of each one of said two active switching elements being driven by a respective one of said first current source and said second current source.

2. The reset circuit according to claim 1, wherein said active switching elements are transistors selected from the group consisting of bipolar transistors and field-effect transistors.

3. The reset circuit according to claim 1, comprising:
   a current mirror circuit including one of said two active switching elements, said one of said two active switching elements having a drain-source path connected between said supply voltage and said junction point, said one of said two active switching elements being driven by said first current source;

said current mirror circuit including another active switching element having a drain-source path connected between said first current source and said ground reference potential, said other active switching element being driven by said first current source.

4. The reset circuit according to claim 3, wherein the reset signal is active low.

5. The reset circuit according to claim 1, wherein the reset circuit is used with a motor vehicle electronic circuit.

6. The reset circuit according to claim 1, wherein said second current source is directly connected to the supply voltage.

* * * * *